United States Patent
Carstens (10) Patent No.: US 6,336,642 B1
(45) Date of Patent: Jan. 8, 2002

(54) SAFETY DEVICE FOR STAIR-CLIMBING SYSTEMS

(75) Inventor: Bernt Carstens, Neustadt (DE)

(73) Assignee: Otto Bock Orthopaedische Industrie Besitz-und Verawaltungs-Kommanditgesellschaft, Duderstadt (DE)

( * ) Notice: Subject to any disclaimer, the term of this patent is extended or adjusted under 35 U.S.C. 154(b) by 0 days.

(21) Appl. No.: 09/555,059

(22) PCT Filed: Nov. 17, 1998

(86) PCT No.: PCT/DE98/03377

§ 371 Date: May 24, 2000

§ 102(e) Date: May 24, 2000

(87) PCT Pub. No.: WO99/28177

PCT Pub. Date: Jun. 10, 1999

(30) Foreign Application Priority Data

Nov. 26, 1997 (DE) ................................. 297 20 939 U (51) Int. Cl.[7] ................................................ B62B 9/02
(52) U.S. Cl. ................... 280/5.22; 280/5.24; 280/5.26; 280/5.28; 180/8.2
(58) Field of Search .................... 180/8.1, 8.2, 8.3, 180/8.7, 9.22, 9.32; 280/5.2, 5.22, 5.24, 5.26, 5.28, DIG. 10, 5.32, 47.12, 47.2

(56) References Cited

U.S. PATENT DOCUMENTS

| | | | |
|---|---|---|---|
| 3,346,268 A | | 10/1967 | Richman |
| 3,614,115 A | * | 10/1971 | Berglund ................. 280/5.32 |
| 3,869,011 A | * | 3/1975 | Jensen ................... 180/9.24 |
| 4,044,850 A | * | 8/1977 | Winsor ..................... 180/9.2 |
| 4,061,199 A | | 12/1977 | Last |
| 4,109,740 A | * | 8/1978 | Andruchiw .................. 180/8 |
| 4,142,732 A | * | 3/1979 | Boyd ........................ 280/5.26 |
| 4,421,189 A | * | 12/1983 | Watkins et al. ............. 180/8 |
| 4,432,425 A | | 2/1984 | Nitzberg |
| 4,512,588 A | * | 4/1985 | Cox ........................... 280/5.26 |
| 4,556,229 A | * | 12/1985 | Bihler et al. ............... 280/5.22 |
| 4,566,707 A | * | 1/1986 | Nitzberg ..................... 180/8.2 |
| 4,645,222 A | * | 2/1987 | Hester ....................... 280/5.26 |
| 5,036,929 A | * | 8/1991 | Trougouboff .............. 180/8.2 |
| 5,641,030 A | * | 6/1997 | Toselli ....................... 180/9.32 |

FOREIGN PATENT DOCUMENTS

| | | |
|---|---|---|
| DE | 3226294 C2 | 12/1988 |
| DE | 3713564 C4 | 5/1989 |
| DE | 29703176 U1 * | 6/1998 |
| FR | 2 574 740 | 12/1984 |
| GB | 2264283 A * | 8/1993 |
| WO | WO90/00997 | 2/1990 |

* cited by examiner

Primary Examiner—Brian L. Johnson
Assistant Examiner—Daniel Yeagley
(74) Attorney, Agent, or Firm—Whitman, Curtis & Christofferson (57) ABSTRACT

A safety device for stairway elevator systems (10) used for transporting apparatus and goods, especially wheelchairs (9) with persons who are unable to walk. The device is characterized in that the stairway elevator (10) or wheelchair (9) is fitted with a mounting device (20) equipped with a rotation pin (21). A support bracket (30) is mounted on the rotation pin (21) and a braking and blocking device (40) is attached to both the support bracket (30) and mounting device (20). A sensor (70) controls the braking and blocking device (40) in such a way that it blocks the support bracket (30) as soon as the stairway elevator (10) is at risk of tipping over and down the stairs (1) and releases the support bracket (30) when the stairway elevator (10) is placed at a correct angle to the stairs(1).

32 Claims, 6 Drawing Sheets

SAFETY DEVICE FOR STAIR-CLIMBING SYSTEMS

BACKGROUND OF THE INVENTION

The invention relates to safety devices to be used with stair-climbing systems (also referred to as "stair-climbers") for conveying equipment and goods, in particular wheelchairs with handicapped persons.

Two construction principles are widely known for stair-climbers used for conveying wheelchairs with handicapped persons in stairways. One construction principle uses crawler chassis. The crawlers are long enough for at least three stairs to be grasped at the same time. In this way, accidental tipping over of the wheelchair and the person is impossible, so that falls with resulting injuries or even deaths are ruled out. These stair-climbers have problems with narrow and curved stairways, however, due to the length and width of the crawler chassis.

The other construction principle uses numerous wheels that rotate not only around their own axle but at the same time around an axle shared by all wheels. Cf. DE-C 37 13 564 or DE-C 32 26 294. With these apparatuses, it is advantageous on the one hand that only rubber-tired wheels come into contact with the stairway and, in particular, the stair edge, in such a way that damage is largely ruled out; on the other hand, it is quite dangerous that the wheels can only engage the steps to a limited depth. Operating these devices therefore requires particular caution and circumspection, namely not the least because the load is a human being. In actual fact, however, stairways have many different designs: they range from relatively flat stairways running completely straight to narrow, steep, winding staircases. Climbing the stairs with the stair-climbers based on the multiple-wheel principle is not without danger because the apparatus can tilt. The stair-climber, the wheelchair and the person must therefore be held by a strong operator. Unfortunately, accidents still take place repeatedly.

SUMMARY OF THE INVENTION

The present invention is based on the technical problem of indicating safety devices to add on to stair-climbing systems in danger of tilting over.

This technical problem is solved by safety devices.

These safety devices, for which there are the designs and further developments defined, have numerous advantages.

A first advantage quite substantial for the interested parties is that they can be added on to all known stair-climbing systems, including stair-climbers for conveying wheelchairs with handicapped persons, and those yet to be developed, in such a way that falls will no longer be possible in the future.

A further advantage is that the support arm can be constructed relatively short, because it only needs to bridge over one to two stairs. Since it is also very narrow, tightly winding stairways do not pose any problems either.

As a third advantage, it should be cited that the support arms according to the invention do not in any way change the handling of the stair-climber system itself, because in the normal situation, they are fully movable relative to the stair-climber system. Only when the stair-climber system assumes a position where there is danger of tilting over is the hinge of the support arm blocked, namely until the operator has brought the stair-climber system back into a safe position.

According to a first, preferred design of the invention, devices mounted in the lower end area of the support arm and preferably made of an elastic and thus stairway-protecting material bring about a support action impacting largely vertically on the stepping surface of the next step down and the step below that. It has been shown that the support on the stepping surface of the stairs is much safer and more reliable than a support at the front edge of the steps. The jolt caused when the hinge is blocked is optimally intercepted.

At the free end of the support arm, numerous of support feet are preferably mounted or molded on, one of which supports itself on the stepping surface of the next step down or the step below that in case of danger, as already mentioned. The arrangement of several support feet makes possible an optimal adaptation to different heights and depths of the stairs.

According to a further development, the support feet are divided into two units. One unit, preferably the upper one, is mounted sliding and pivoting on the support arm against a spring and is equipped with a blocking system that blocks the movable unit as soon as the force brought to bear on the stairway overcomes the force of the spring, which is always the case when the stair-climber is in danger of falling over the stairway and the braking and blocking system has blocked the hinge of the support arm.

In particular in order to protect the stair edges, according to an advantageous further development of this invention it is recommended to mount a runner parallel to the support arm, wherein a draw spring pulls the support arm into the runner in such a way that in the normal situation, only the front edge of the runner rests on the stair edges. It is understood that the spring force must be measured in such a way that in case of danger, the support feet of the support arm can deploy their support function without delay.

The runner preferably has a U-shaped cross-section. In this way, in the normal situation the support arm and its support feet are covered on all sides.

In order to protect the stair edges, the front edge of the runner can be coated with an easily sliding material. An even better protection results when a continuous belt is mounted in front of the front edge of the runner.

As was already mentioned, the hinge of the support arm must be blocked as immediately as possible as soon as the stair-climber leans dangerously forward and threatens to fall down the stairway. That means that the angle of the stair-climber must always be measured and monitored.

For this purpose, a heeling sensor is preferably used, in the form of a pendulum mounted on the stair-climber or on the mounting system.

Several variants are possible for the system for blocking the hinge.

According to a first variant, the braking and blocking system consists of a ratchet wheel and a ratchet. In this connection, the center of the ratchet wheel is preferably situated in the center of the axis of rotation. The ratchet is designed as a pendulum and mounted swinging around its own axis on the mounting system. As soon as the stair-climber tips forward, the ratchet engages the teeth of the ratchet wheel and blocks the hinge. Such a blocking system is mechanically simple and functionally reliable.

According to a variant thereof, the center of the ratchet wheel is offset relative to the axis of rotation. The ratchet is mounted swiveling around its own axis on the mounting system and is held in its home position defined by a spring between the ratchet and the mounting system. This variant of construction has the advantage that the ratchet does not have to adjust itself due to gravity, thus allowing greater freedom in construction. Also, the function corresponds to that of the first variant.

In both variants, the ratchet advantageously consists of a low-mass part that quickly engages the ratchet wheel due to its low mass, and a high-mass part that is responsible for maintaining the vertical direction. Both parts are drawn together by a spring that is weak enough, however, that the ratchet's rapid engaging of the ratchet wheel is not delayed.

In both forms of construction, the angle of the ratchet wheel relative to the support arm is advantageously adjustable. In this way, shifting of the overall center of gravity, caused by different dimensions and weights of the stair-climber, the wheelchair and the handicapped person, can be compensated.

An alternative form of construction for the braking and blocking system is a lockable tension bar of finite length between the support arm and the mounting system or stair-climber.

A shoe brake can also be used as an alternative to this.

A spring band belt brake is preferred, because it works very quickly and reliably and has the necessary freewheeling function.

As an alternative, an electric coupling can also be used.

According to a further variant, the braking and blocking system is designed as a lockable cylinder piston unit. These are preferably cylinder piston units with an internal fluid circuit and a check valve—controlled by the heeling sensor—in the fluid circuit. Hydraulic oils as well as gases come into consideration as the fluid.

According to an advantageous further development of the invention, there is a support spring between the support arm and the mounting plate. This support spring must be designed in such a way that it is powerless when the stair-climber system is in the properly inclined position relative to the stairway. If the stair-climber leans backward toward the stairway, the spring presses it back into the normal position. If the stair-climber is tending to tilt dangerously forward, the spring pulls it back into the proper position. In both cases, the support spring thus relieves the operator in terms of strength.

If the support arm is equipped with a runner, the springs between the support arm and the runner as well as between the support arm and the mounting system are to be coordinated in terms of force in such a way that if the stair-climber equipment leans dangerously down the stairs, the runner recedes and thereby releases the support feet to pose themselves on the stair.

To relieve the operator even more and also be able to convey heavy loads quickly and, above all, safely over the stairs, a drive is provided parallel to the braking and blocking system. This can be an electric motor with a screw thread, a hydraulic cylinder or the like. In any case, the drive is controlled dependent upon the difference between the desired position and actual position of the support arm relative to the stair-climber and/or the pressure force of the support arm on the stairway.

To support the support arm on the stepping surface of the stairs, not only support feet are suitable but also, for example, a continuous creeper band. Support wheels that are attached to a two-or three-arm turnstile are also suitable. Constructions of the turnstile and support wheels are already used in stair-climber systems. Lastly, there is even the possibility to equip the safety device with a power-driven drive that actively supports the lift mechanism of the stair-climber and is mounted on the support arm.

According to a first variant thereof, the creeper band or the turnstile with the support wheels can be driven by a motor. According to a second variant, a paternoster-type lift mechanism can also be provided on the support arm.

The lift mechanisms on the stair-climber and on the support arm are preferably synchronized with each other. In this case, the wheelchair is conveyed up and down the stairs with only minimal vibration. The operator has essentially only a guiding function then, and no longer a holding function. Such stair-climbers can thus also be operated by persons with less strength. However, the braking and blocking system remains active in these cases as well and in case of danger, prevents the stair-climber with the wheelchair and handicapped person from tipping over the stairway.

BRIEF DESCRIPTION OF THE INVENTION

With the help of the drawings, the invention will be explained in more detail in the form of an example of execution. They show.

DETAILED DESCRIPTION OF THE INVENTION

Figure 1:
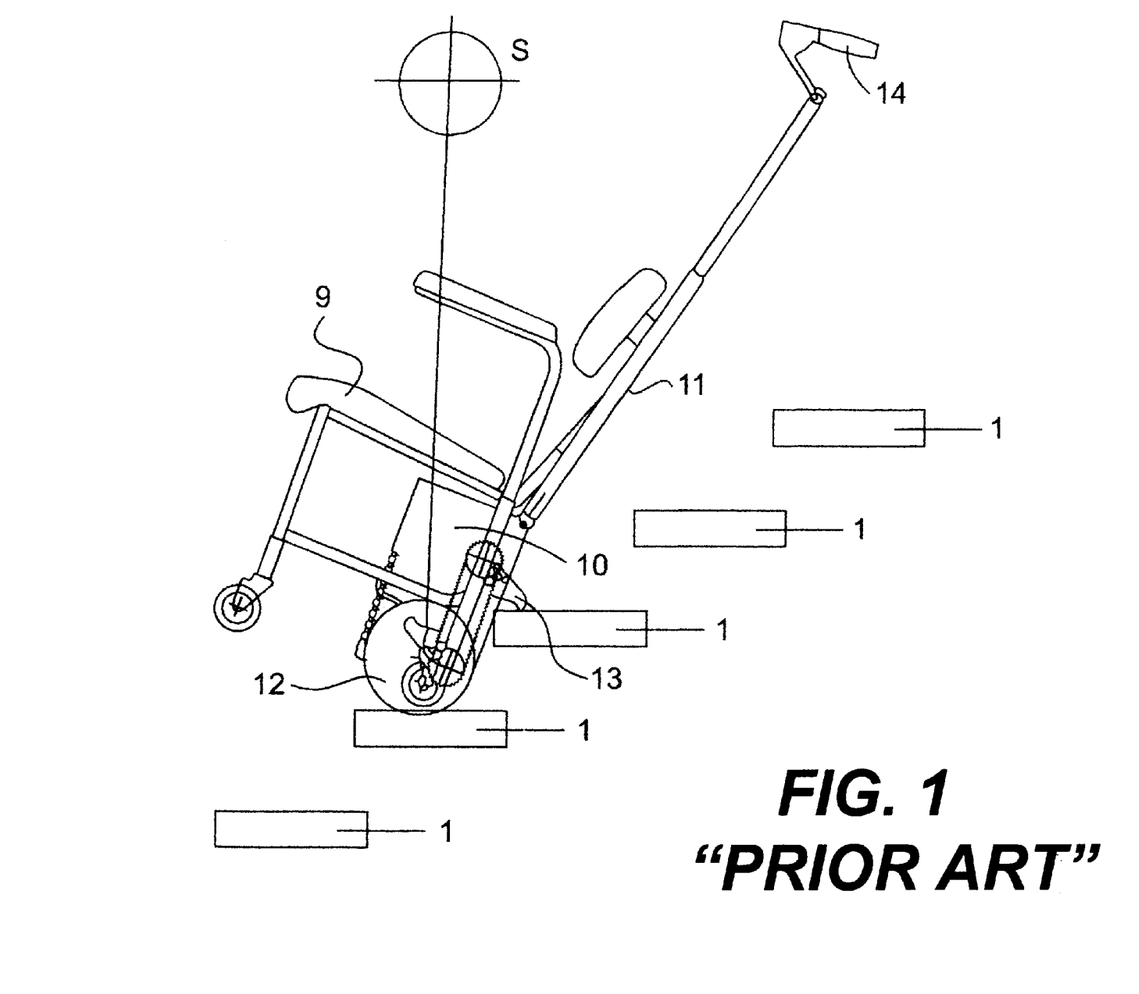
FIG. 1 in schematic diagram, the side view of a stair-climber with a wheelchair on a stairway, FIG. 2 a view of a section of the stair-climber of FIG. 1 with a first safety device, FIG. 3 in cutout form, the stair-climber of FIGS. 1 and 2 with a modified safety device, FIG. 4 a section of the stair-climber of FIG. 1 with a third safety device, FIG. 5 a schematic side view of a stair-climber with wheelchair and a fourth form of construction of a safety device and FIG. 6 a schematic side view of a stair-climber with wheelchair and a fifth form of construction of a safety device.

FIG. 1 shows in a schematic side view a stair-climber system 10 standing on a stairway 1 with a wheelchair 9 attached. The stair-climber system 10 stands with its wheels 12 on a stair. In this case, as an example, a paternoster-like mechanism 13 is illustrated as the lift mechanism for conveying the wheelchair 9 up and down the stairs. In principal, however, all types of comparable lift mechanisms as described in the introductory description are suitable. Handles 14 on an operating rod 11 enable the operator to lean the stair-climber 10, the wheelchair 9 and the handicapped person far enough backwards that the overall center of gravity S of this combination is situated exactly above the axis of the wheels 12, to keep the combination in this position and guide it up and down the stairs.

As soon as the lift mechanism 13 is activated, the wheels 12 lose contact with the stairway 1. In this way, the center of gravity S is now situated in front of the bearing of the stair-climber 10 on the stairway 1. The stair-climber 10, the wheelchair 9 and the handicapped person are in danger of falling forward over the stairway 1. The operator must prevent this by pulling on the handles 14 with appropriate forcefulness. Practical experience has unfortunately proven that this is not always possible.

Figure 2:
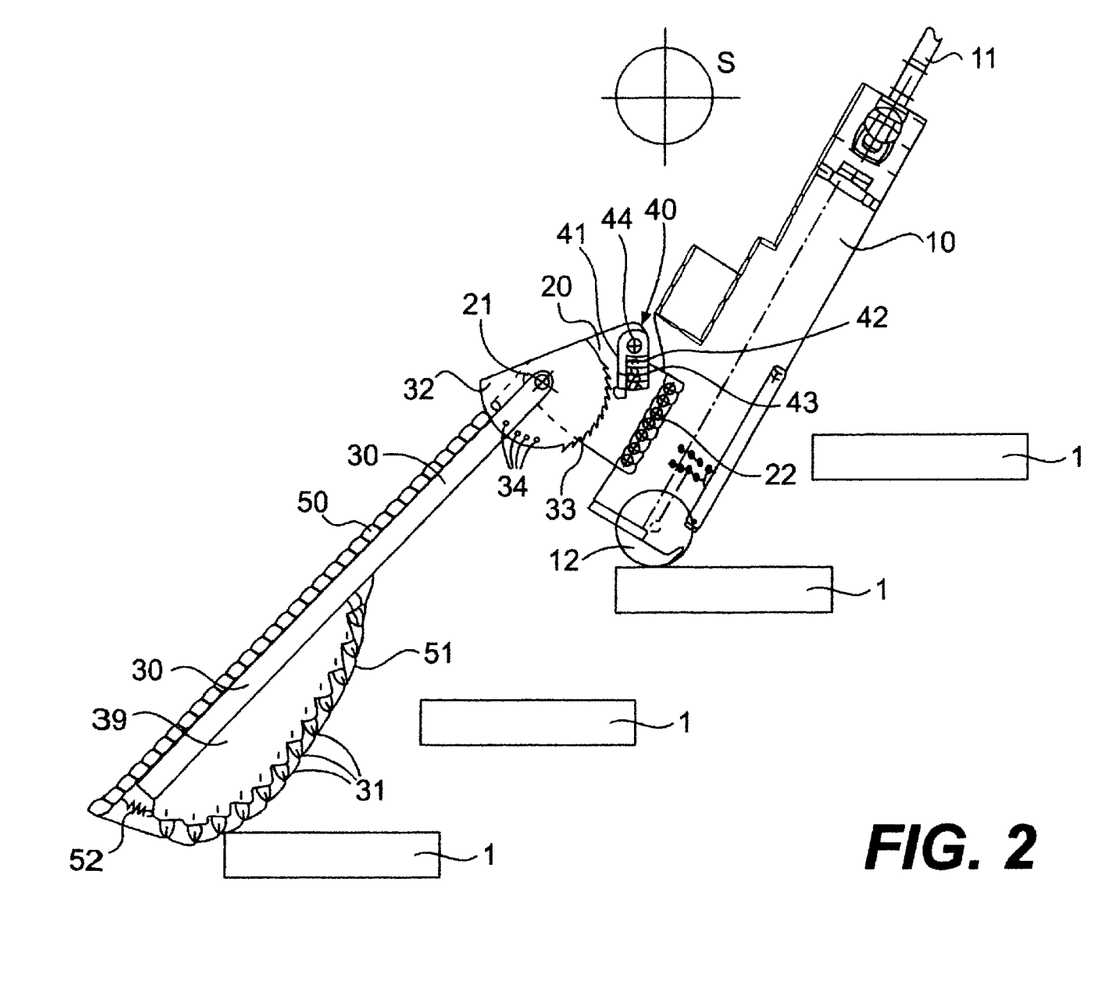

FIG. 2 shows in a schematic, partly broken view, a safety device attached to the stair-climber system 10. The safety device's task is to prevent the combination of the stair-climber system 10, the wheelchair and the handicapped person from falling down the stairs if the center of gravity S shifts too far forward.

The safety device first of all comprises a mounting system 20 that is attached to the stair-climber climber 10. The attachment part 22 of the mounting system 20 can be easily adapted to the respective stair-climber in such a way that the safety device can be added to all types of stair-climbers.

Provided on the mounting system 20 is a horizontal hinge pin 21 on which a support arm 30 is mounted freely rotating. The support arm 30 extends over very few, e.g. one or two stairs 1. At its free end, it is equipped with numerous of non-skid support feet 31 that are mounted on a strut 39 in such a way that in case in danger, they are supported nearly vertically on the stepping surface of a stair 1.

While the support arm 30 must be fully movable relative to the mounting system 20 or the stair-climber system 10 in the normal situation, in case of danger it must be immediately blocked. A braking and blocking system 40 is used for this purpose. In the present example, this consists of a ratchet wheel 32 and a ratchet 41, 42. The ratchet wheel 32 is attached to the support arm 30, in connection with which the angle between the ratchet wheel 32 and the support arm 30 can be adjusted if necessary. Bores 34 are provided for this purpose.

The ratchet 41, 42 is suspended freely hanging from the mounting system 20 around a horizontal axle 44. As long as the stair-climber system 10 is properly inclined rearward, the ratchet wheel 32 and the ratchet 41, 42 are at a certain distance from each other. As soon as the stair-climber system 10 straightens up, the distance between the ratchet 41 and the ratchet wheel 32 shortens according to a sinus function until the ratchet 41 finally engages the teeth 33 of the ratchet wheel 32. In this way, the support arm 30 is blocked and the stair-climber system 10 cannot straighten up further. If the operator leans the stair-climber system 10 properly rearward again, the ratchet 41 is released from the ratchet wheel 32 and the support arm 30 is able to move freely.

As FIG. 2 shows, the ratchet consists of a first, light part 41 that has the ratchet tooth, and a second, heavy part 42 that is responsible for the constant vertical position due to gravity. Both parts 41, 42 are connected via a light spring 43. Due to this two-part construction, the ratchet tooth on the light ratchet part 41 can very quickly engage the ratchet wheel teeth 33.

A runner 50 with U-shaped cross-section is inverted via the support arm 30 and the support feet 31. A draw spring 52 pulls the support arm 30 into the runner 50. The front surface 51 of the runner 50 is shaped in such a way that the support feet 31 disappear behind the front surface 51 in the normal situation. In this way, only the front surface 51 slides on the stair edges. If the front edge 51 is coated with an easily sliding material, the stair edges are protected The draw spring 52 is weak enough, however, to ensure that in case of danger, the support feet 31 can brace themselves without delay—sitting largely vertically—on the stepping surface of the next stair 1.

Figure 3:
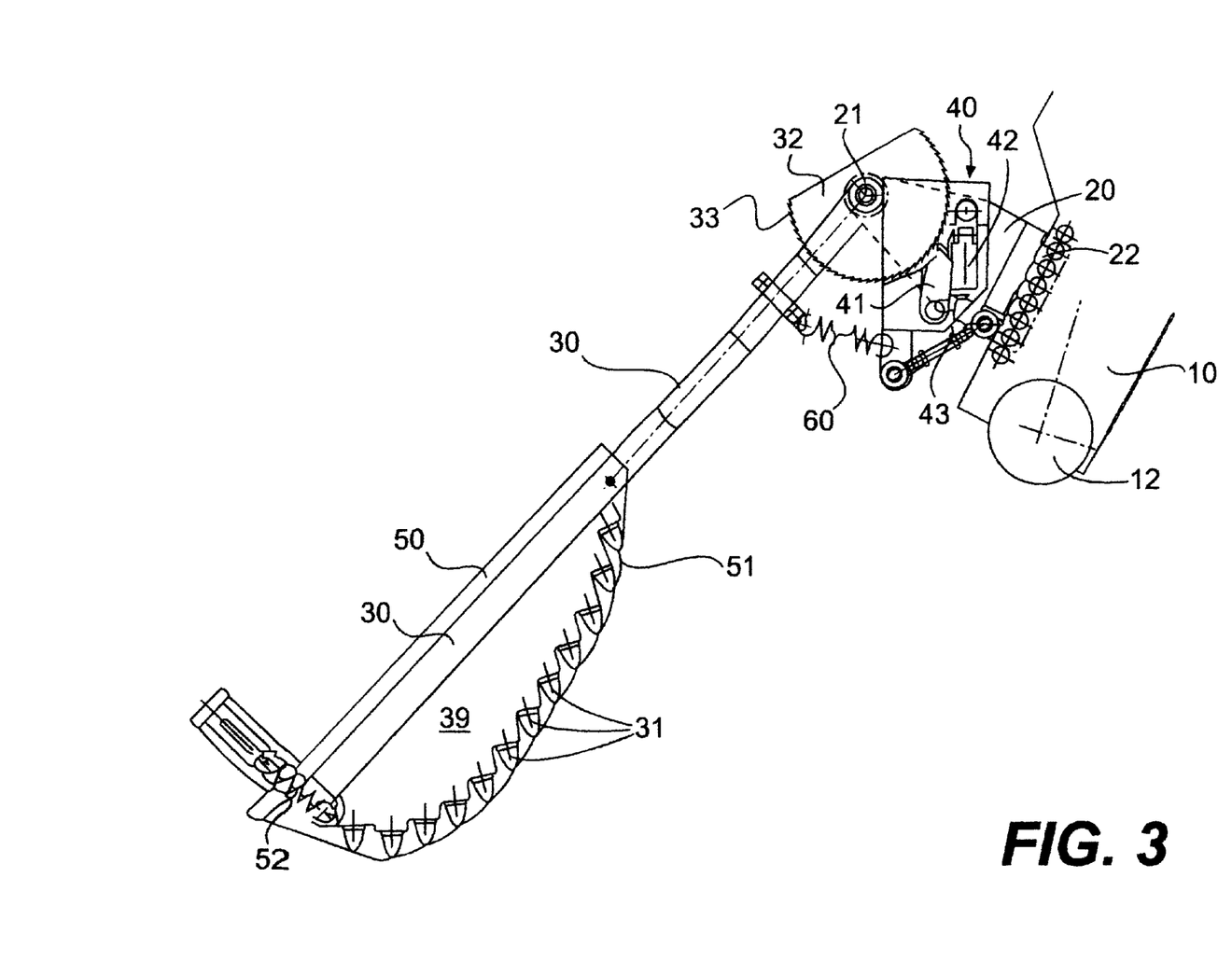

FIG. 3 shows a second form of construction of a safety device 40' on the stair-climber 10. The ratchet engaging the teeth 33 of the ratchet wheel 32 is once again in two parts 41', 42', that are connected by a weak spring 43; but in the present case only the heavy ratchet part 42' is mounted suspended, while the light ratchet part 41' is standing. The function of the ratchet 41', 42' otherwise corresponds to the function of the ratchet 41, 42 in FIG. 2.

An additional support spring 60 is provided between the mounting system 20 and the support arm 30. It is sized in such a way that it is powerless when the stair-climber 10 is in the properly inclined position relative to the stairway 1. If the stair-climber 10 changes its position forward or rearward, the support spring 60 pulls or presses the stair-climber 10 back into the proper position.

The forces are transmitted via the support arm 30 and the runner 50 onto the respective stair. In this way, the operator is relieved of the stair-climber 10.

In order not to lose the receding function of the runner 50, 51 in case of more pronounced, dangerous leaning of the stair-climber 10 downward, the two springs 52, 60 must be coordinated in terms of force.

Figure 4:
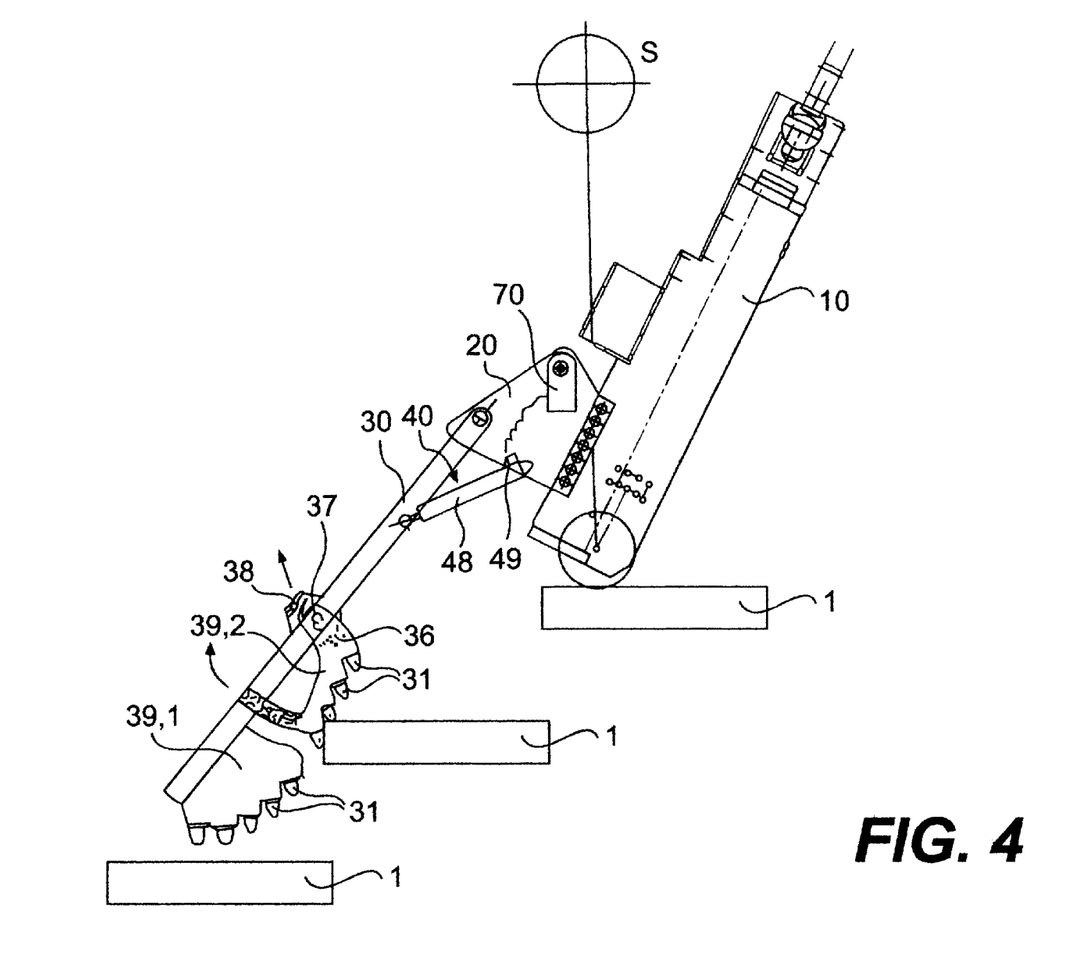

FIG. 4 shows a third form of construction of a safety device on the stair-climber 10. A lockable cylinder piston unit 48 with internal fluid circuit and an electrically controllable check valve 49 in the fluid circuit is provided as the braking and blocking system 40" between the mounting system 20 and the support arm 30. The position of the stair-climber 10 on the stairway 1 is measured by means of an electromechanical heeling sensor 70 that transmits a blocking signal to the check valve 49 when the stair-climber 10 assumes a dangerous position.

As a modification of the forms of construction of FIGS. 2 and 3, in the present example of construction the strut on which the support feet 31 are situated is designed in two parts. One strut part, the lower unit 39.1, is rigidly attached to the support arm 30. On the other hand, the second strut part, the upper unit 39.2, is mounted able to slide and swivel relative to the support arm 30. In a further development, a blocking system 36 is provided to block the upper unit 39.2 in the event the stair-climber 10 is in danger of falling over the stairway and when the braking and blocking system 40 has blocked the hinge of the support arm 30. A combination 37 of a stud and an elongated hole in connection with a pressure spring 38 is used to effect the sliding and swiveling of the upper unit 39.2.

Thanks to such a two-part design of the strut 39.1, 39.2, the safety device is also suitable for extremely flat stairways 1.

Figure 5:
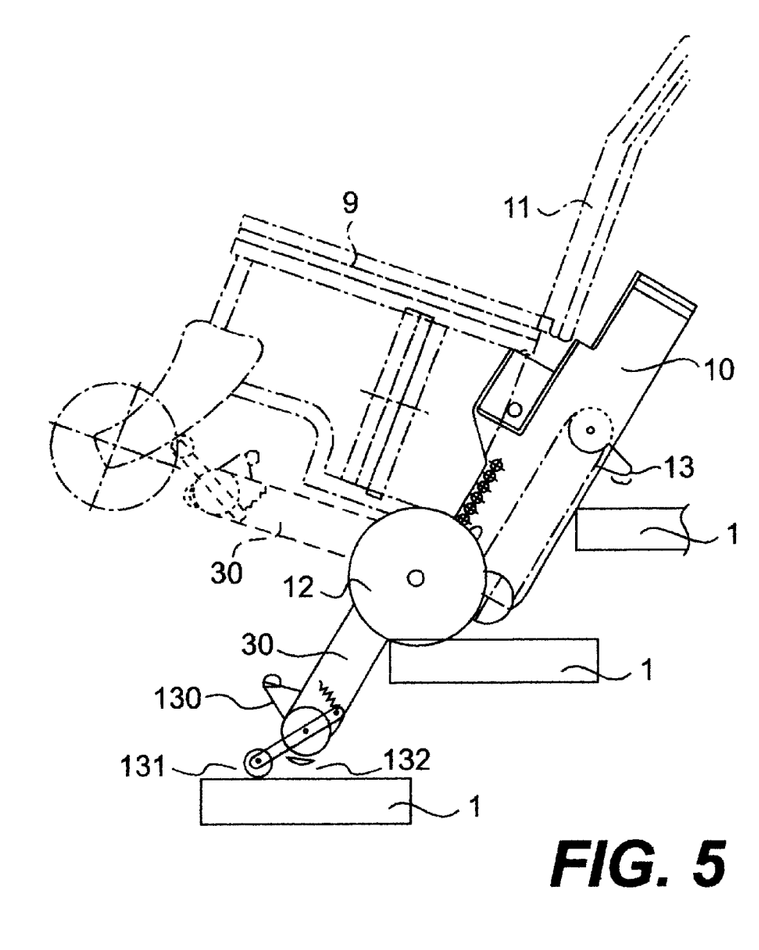

FIG. 5 shows an active safety device. For this, the support arm 30 is equipped with a motor-driven lift system 130 that corresponds to the lift mechanism 13 of the stair-climber 10. A jockey roller 131 and a touch sensor 132 are used as control and safety switch for the lift system 130. When the lift mechanism 13 on the stair-climber 10 is properly coordinated with the lift system 130 on the support arm 30, the two lift mechanisms run synchronously and the wheelchair 9 with the handicapped person is conveyed up and down the stairs practically without any function-related tilting movements of the wheelchair 9. Owing to the braking and blocking system still present, however, in this case as well the support arm 30 is immediately blocked if the stair-climber 10 straightens up dangerously and threatens to fall over the stairway 1. It is understood that in such a case, the lift mechanisms 13, 130 are immediately stopped.

Figure 6:
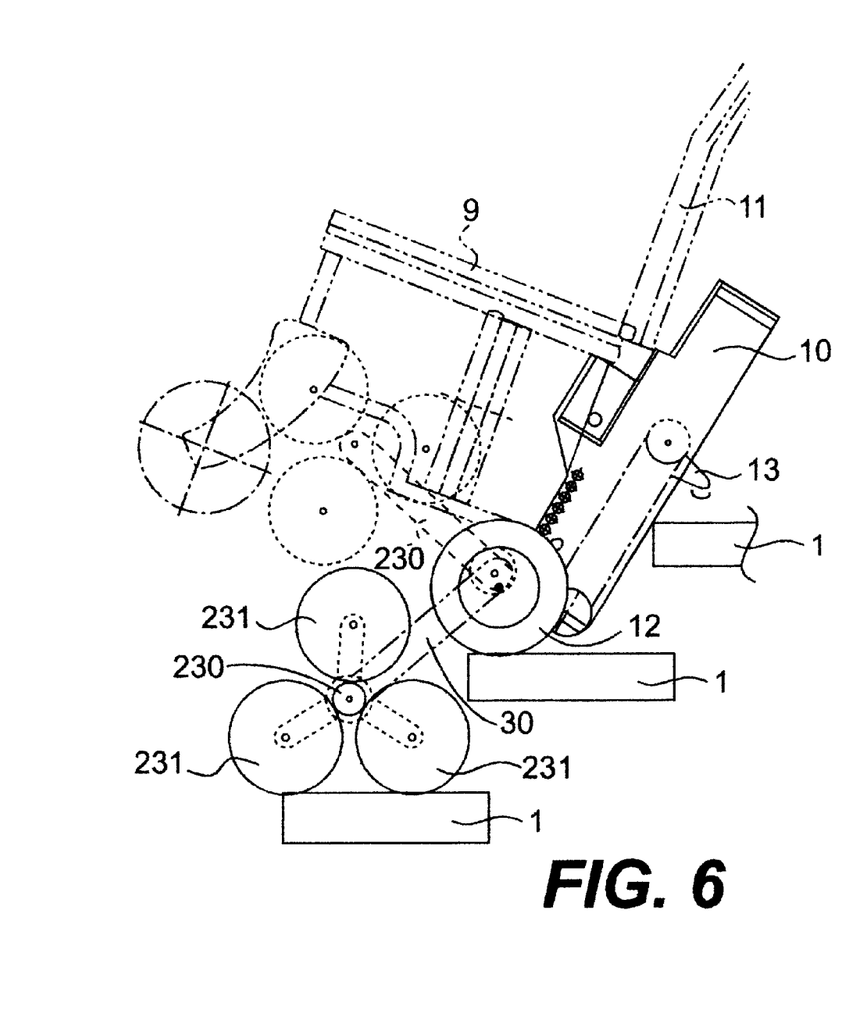

FIG. 6 shows a safety device that can be designed passive as well as active. At the free end of the support arm 30, a three-arm turnstile 230 is attached rotating and has three support wheels 231. The support wheels 231 are supported on the stepping surface of the stairs. If the turnstile 230 is motor-driven and the rotational speed is synchronized with the lift drive 13, the wheelchair 9 is conveyed up and down the stairs problem-free and practically without vibrations once again.

In addition, as FIGS. 5 and 6 show, the support arm 30 with the attached devices and mechanisms can be swung under the wheelchair 9 if the wheelchair 9 is driven or pushed on level surfaces.

What is claimed is:

1. A safety device to be used with stair-climber systems for conveying equipment and goods, and adapted for use with wheelchairs with handicapped persons, comprising:
   a mounting system for attaching to the stair-climber system or to the wheelchair;
   a hinge pin hingedly attached to the mounting system;
   a support arm rotatably mounted on the hinge pin and adapted to extend below said wheel chair or stair climber;
   a braking and blocking system attached to the support arm on one end and to said mounting system on an end thereof; and
   a sensor for determining an angle of inclination of the stair-climber in order to control the braking and blocking system to block the support arm when the stair-climber and the wheelchair begin to tip over when ascending or descending a stairway, and release the support arm when the stair-climber and wheelchair are inclined properly relative to the stairway.

2. The safety device according to claim 1, further comprising:
   devices attached in a lower end area of the support arm which bring about a support action impacting substantially vertically on a stepping surface of a next stair down or on a stair below the next step down.

3. The safety device according to claim 1, further comprising:
   at least two support feet mounted or molded on a free end of the support arm, one of the at least two support feet supports itself on the stepping surface of a step when the stair-climber and wheelchair begin to tip over.

4. The safety device according to claim 3 wherein:
   the support feet are divided into a lower unit and an upper unit, wherein:
   the upper unit is mounted sliding and pivoting on the support arm against a spring; and
   a blocking system blocks the upper unit as soon as a force brought to bear on the stairway as overcome the force of the spring.

5. The safety device according to claim 4, wherein the blocking device includes:
   a pin on the support arm;
   an elongated hole on the movable unit;
   teeth on the support arm; and
   a tooth on the movable unit.

6. The safety device according to claim 3 wherein:
   the support feet are divided into two units, wherein:
   one unit of the two is mounted sliding and pivoting on the support arm against a spring; and
   a blocking system blocks the one unit as soon as a force brought to bear on the stairway has overcome the force of the spring.

7. The safety device according to claim 1, further comprising:
   a runner mounted parallel to the support arm; and
   a tension spring pulling the support arm into the runner in such a way that when the stair-climber is inclined properly relative to the stairway only a front edge of the runner rests on the edges of the stairs.

8. The safety device according to claim 7, wherein the runner has a U-shaped cross-section.

9. The safety device according to claim 7, wherein the front edge of the runner is coated with a sliding material.

10. The safety device according to claim 1, wherein the sensor is a pendulum mounted on the stair-climber or on the mounting system.

11. The safety device according to claim 1, wherein the braking and blocking system includes:
    a ratchet wheel; and
    a ratchet which engages said ratchet wheel.

12. The safety device according to claim 11, wherein a center of the ratchet wheel is situated in a center of the hinge pin, and the ratchet is designed as a pendulum and is mounted swinging on the mounting system around an axle.

13. The safety device according to claim 12, wherein the ratchet includes a low-mass part and a high-mass part, and a spring pulls both the low mass part and the high mass part together.

14. The safety device according to claim 11, wherein:
    the center of the ratchet wheel is offset relative to the hinge pin;
    the ratchet is mounted swiveling on the mounting system around an axle; and
    a spring between the ratchet and the mounting system defines a home position of the ratchet.

15. The safety device according to claim 11, wherein an angle of the ratchet wheel relative to the support arm is adjustable.

16. The safety device according to claim 1, wherein the braking and blocking system is a lockable tension bar of finite length between the support arm and the mounting system or the stair-climber.

17. The safety device according to claim 1, wherein the braking and blocking system is a shoe brake.

18. The safety device according to claim 1, wherein the braking and blocking system is a spring band brake.

19. The safety device according to claim 1, wherein the braking and blocking system is an electric coupling.

20. The safety device according to claim 1, wherein the braking and blocking system is a lockable cylinder piston unit.

21. The safety device according to claim 20, wherein the lockable cylinder piston unit has an internal fluid circuit and a check valve controlled by the sensor in the fluid circuit.

22. The safety device according to claim 1, further comprising a support spring provided parallel to the braking and blocking system, wherein the support spring is powerless when the stair-climber is properly inclined relative to the stairway.

23. The safety device according to claim 22, further comprising:
    the support spring being weaker than a tension spring which pulls the support arm in a first direction into a runner in such a way that when the stair-climber is inclined uprightedly relative to the stairway only a front edge of the runner rests on the edges of the stairs.

24. The safety device according to claim 1, further comprising:
    a drive provided parallel to the braking and blocking system, wherein the drive is controlled by at least one of a difference between a desired and an actual position of the support arm relative to the stair-climber and a pressure force of the support arm on the stairway.

25. The safety device according to claim 24, wherein the drive and the braking and blocking system are integrated into a single unit.

26. The safety device according to claim 1, further comprising a continuous creeper band attached to the support arm.

27. The safety device according to claim 26, wherein the continuous creeper band is motor-driven.

28. The safety device according to claim 1, wherein a turnstile with at least two support wheels is attached at a free end of the support arm.

29. The safety device according to claim 28, wherein the turnstile is motor-driven.

30. The safety device according to claim 29, wherein the motor-driven turnstile is synchronized with a lift mechanism of the stair-climber.

31. The safety device according to claim 1, further comprising a paternoster lift mechanism attached to a free end of the support arm.

32. The safety device according to according to claim 1, wherein:

the support arm is pivotally attached so as to be freely rotating on the hinge pin, and the hinge pin is rigidly attached to the mounting system.

* * * * *